No. 764,255. PATENTED JULY 5, 1904.
A. ROBINSON.
CAR FENDER.
APPLICATION FILED MAR. 24, 1904.
NO MODEL.

Witnesses:
K. H. Butler
E. E. Potter

Inventor
A. Robinson,
By N. C. Evert & Co.
Attorneys.

No. 764,255.

Patented July 5, 1904.

UNITED STATES PATENT OFFICE.

ALFRED ROBINSON, OF PITTSBURG, PENNSYLVANIA.

CAR-FENDER.

SPECIFICATION forming part of Letters Patent No. 764,255, dated July 5, 1904.

Application filed March 24, 1904. Serial No. 199,686. (No model.)

*To all whom it may concern:*

Be it known that I, ALFRED ROBINSON, a subject of the King of Great Britain, residing at Pittsburg, in the county of Allegheny and State of Pennsylvania, have invented certain new and useful Improvements in Car-Fenders, of which the following is a specification, reference being had therein to the accompanying drawings.

This invention has relation to car-fenders; and the object of my invention is to provide a car-fender which may be easily attached to any form of car construction now used, and I provide means in connection with my improved car-fender whereby the same may be held in an elevated position and lowered by the operator of the car at any desired time when the use of the fender is necessary.

Another object of my invention is to construct a car-fender of the above type which will be comparatively light in construction yet strong and durable and comparatively inexpensive to manufacture, and in carrying out my invention I employ a suitable fender-frame which is pivoted under the platform of the car, and in this frame is secured a netting which is adapted to catch and support an object or human being when the same is thrown therein. I also provide means in connection with my improved fender whereby the object or human being will be propelled or swept into the net of the car-fender without being injured.

A particular feature of my invention resides in the fact that the fender is normally held out of use, whereby upon the operator of the car noticing an object or human being in danger of being struck by the car he can immediately lower the fender, whereby should escape be impossible for the object or human being the same will be caught up by the fender and prevented from coming into contact with the wheels of the car.

With the above and other objects in view reference will be had to the drawings accompanying this application, wherein like numerals of reference indicate like parts throughout the several views of the drawings, in which—

Figure 1:
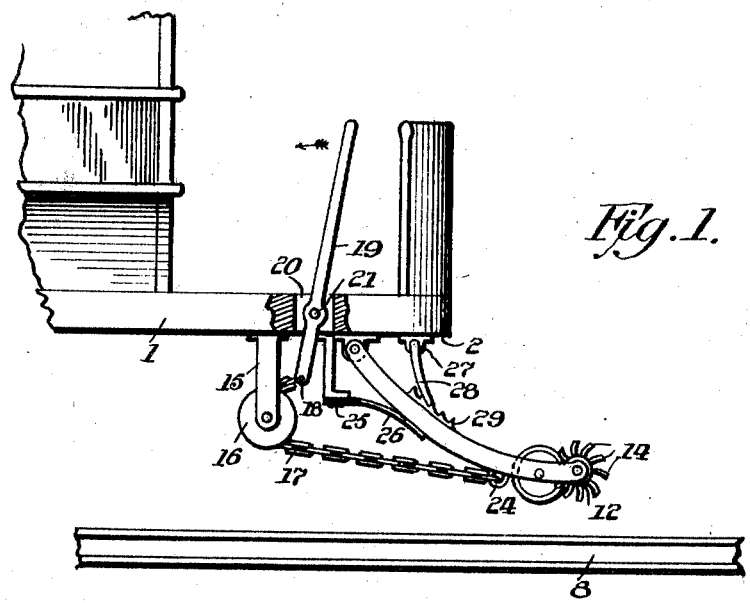
Figure 2:
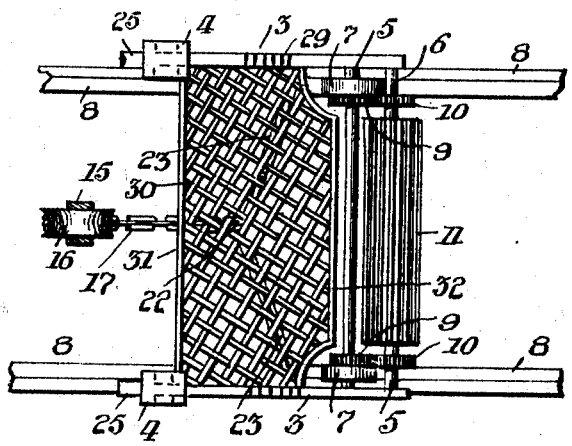

Figure 1 is a fragmentary side elevation view of a car, showing my improved car-fender as applied to one end thereof, the same being shown in a raised position; and Fig. 2 is a top plan view of my improved fender, showing the same detached from the platform of the car.

In the accompanying drawings the reference-numeral 1 indicates the platform of a car, upon the bottom 2 of which is pivotally mounted my improved car-fender, this car-fender consisting of side arms 3 3, the upper ends of which are pivoted in bearings 4 4, which are secured to the bottom 2 of the platform. The lower ends of these arms have journaled therein two shafts 5 and 6, and upon shaft 5 I provide rubber-tired wheels 7 7, these wheels being carried within the arms 3 3 and are adapted when the fender is in its lowered position to engage with the tracks 8 8, upon which the car travels. Formed integral with these wheels or otherwise mounted within their inner faces are the gear-wheels 9 9, these gear-wheels meshing with similar gear-wheels 10 10, carried upon the shaft 6. The shaft 6 also carries intermediate these gear-wheels a flanged roller 11, this roller extending almost the entire distance between the gear-wheels 10 10, and the rollers are constructed of a body portion 12, to which are secured by any suitable means the rubber flanges 14.

Adjacent to where the arms 3 3 are pivoted to the bottom of the platform I secure a downwardly-extending bracket 15, this bracket being located centrally of the car, and in the lower end thereof is journaled a wheel 16, around which passes a chain 17, the one end of the chain being connected to the lower end 18 of a lever 19, this lever extending up through an aperture 20, formed in the platform of the car and pivoted therein by a pin 21. This lever extends to such a height that the same may be easily and quickly operated by the operator of the car, and the object of said lever will be hereinafter described more fully in the operation of my improved fender. The other end of the chain is connected, as indicated by the reference-numeral 22, to chains 23 23, these chains in turn being connected to eyes 24 24, carried upon the under faces of the arms 3 3. Directly in the rear of the bearings 4 4 I secure to the bottom of the platform downwardly-extending brackets 25 25, which have secured on their lower ends by any suitable means, such as screws, springs 26 26, the upper end of these springs bearing against the under face of the arms 3 3 and support the fender in an elevated position, as shown in Fig. 1 of the drawings.

Secured to the bottom 2 of the platform 1 are mounted bearings 27 27, said bearings being mounted directly in front of the bearings 4, and in said bearings 27 27 are journaled pawls 28 28, which engage teeth 29 29, carried upon each arm 3 3 of the fender.

Between the arms 3 3 I mount a suitable netting, which may be of wire mesh, rope, or any suitable material. This netting, as designated by the reference-numeral 30, is supported between the arms 3 3 and the cross-braces 31 and 32, said netting extending to within a short distance of the shaft 5 and nearly to the bottom 2 of the car-fender.

The operation of my improved car-fender is as follows: As illustrated in Fig. 1 of the drawings, the normal position of the car-fender is in a raised position, the fender being held in this position by means of the springs 26 26, which bear against and support the arms of the car-fender. In case it be desired to lower the car-fender into an operating position the operator of the car moves the lever in the direction of the arrow, in which case the chain will be drawn over a pulley 16 and the other end of the fender lowered until the rubber-tired wheels 7 7 engage with the tracks 8 8, at which time the movement of the car will cause the wheels to rotate, and through the medium of the gear-wheels 9 9 and 10 10 a rotary motion will be imparted to the rubber-flanged roller 11, said roller rotating in a direction whereby if an object or human being is struck by the same it will be expelled or discharged into the netting 30, carried between the arms 3 3, by which time the car can be brought to a stop and the object or human being removed therefrom. When the fender is lowered, the pawls 28 28 are adapted to engage the teeth 29 29, carried by the arms 3 3, and hold the fender in this lowered position until the pawls are released by the operator of the car, at which time the fender will be returned to its raised position by the springs 26 26.

While I have herein shown my improved car-fender as applied to a street-car, it is obvious that the same may be readily employed upon any vehicle, especially automobiles and the like.

It may be noted that the general arrangement of the gear-wheels and the netting may be changed and that other slight changes in the details of construction may be made without departing from the general spirit and scope of my invention.

What I claim, and desire to secure by Letters Patent, is—

1. In a fender of the character described, the combination with a car, a framework pivotally carried by said car, a spring carried by said car for supporting said framework in a raised position, a roller carried by said framework, means carried by said framework to impart a rotary movement to said roller when said fender is in a lowered position, means carried by said car and manually operable from the platform thereof for positively lowering said fender, means to lock said frame in lowered position.

2. In a car-fender the combination of a frame pivotally attached to the platform, a netting carried in said frame, a spring adapted to sustain the frame in raised position, a lever pivoted on the platform and projecting above the same and a connection between said lever and said frame whereby the frame may be positively lowered.

3. The combination with a car of a fender-frame pivotally secured to the platform, a spring attached to the platform and bearing against said fender to raise the same, a lever pivoted to the platform and projecting upward above the same, a wheel journaled on the bottom of the platform, a flexible connection between the said lever and the fender-frame and means whereby the fender will be automatically locked in position when lowered by the operation of said lever.

In testimony whereof I affix my signature in the presence of two witnesses.

ALFRED ROBINSON.

Witnesses:
H. C. EVERT,
E. E. POTTER.